PROGRAMMED MESSAGE CONTROL SYSTEM

Filed July 24, 1963

Charles W. Roberts, Jr.
Helen Hughes Roberts
INVENTORS

BY Clarence A. O'Brien
and Harvey B. Jacobson
Attorneys

United States Patent Office 3,330,915
Patented July 11, 1967

3,330,915

PROGRAMMED MESSAGE CONTROL SYSTEM

Charles W. Roberts, Jr., and Helen Hughes Roberts, Taylor, Tex. (both of 600 Denise, West Columbia, Tex. 77486)

Filed July 24, 1963, Ser. No. 297,325
11 Claims. (Cl. 179—100.2)

ABSTRACT OF THE DISCLOSURE

A control system for multi-track tape playback apparatus the operation of which is initiated by the operator during idle periods between automatically programmed interruptions in the recorded reproduction. Thus, operation is resumed under operator control by actuation of a single switch that triggers an operational sequence necessary to properly initiate operation of the apparatus each time. Functioning of the switch is however limited by the system to the aforementioned idle periods when the apparatus is shut down.

This invention relates to a control system for recording playback apparatus and more particularly to a selectively controlled programming device useful in connection with recorded messages, announcements, musical sounds, voices, etc.

The control system of the present invention is especially useful in connection with the programmed reproduction of meditation, prayers and instructions in places of worship so as to relieve the minister or congregation leader from continuous and direct participation therein. It should of course be appreciated, that the control system is not necessarily limited to the aforementioned environment since it may be similarly utilized for programming reproduction under selective control, in general, from an externally initiated source.

While control systems have heretofore been devised for controlling operation of recorded sound producing apparatus, they have suffered from several defects which are significant in connection with the objectives of the present invention. Thus, some of the important prerequisites for the control system satisfied by the apparatus of the present invention, include the elimination of sequential switch operation usually necessary in connection with record playback apparatus for the supply of electrical energy thereto, in order to energize the drive control circuits, pickup heads and amplifiers and to start, stop and disenage the record or tape transport mechanism. Other requirements for the control system are the provision of means for disconnecting the power supply during the intervals between sound reproduction, and yet provide for fail-safe operation at the proper times. Also, the cooperation between the sound reproducing apparatus and the control system must be such as to preserve the reproduction quality or fidelity of the reproducing apparatus. Finally, the control system should also make provisions for indicating the condition thereof and measure the progress of the programmed reproduction.

It is therefore a primary object of the present invention to provide control apparatus utilized in combination with commercially available sound reproducing apparatus for initiating under remote selective control the reproduction of a self-programmed portion of a recording, reproduction being resumed each time under selective control so that while each recording segment is of a self-programmed length, the interval between each recording segment is under selective control of the operator.

Another object of the present invention is to provide a control system for sound reproducing apparatus, operation of which is initiated in proper timed sequence by a selectively produced starting signal terminated when the operation of the sound reproducing apparatus is initiated so that only after a self-programmed reset signal from the reproducing apparatus is dispatched to stop operation thereof, will another selectively produced start signal be operative to restart operation of the sound reproducing apparatus.

An additional object of the present invention is to provide a control system for sound reproducing apparatus such as a tape recorder having playback facilities of the dual track type providing for programmed interruption which is selectively resumed and wherein the power supplied to the apparatus and most of the components of the control system is shutdown during the interruption intervals.

A still further object of the present invention is to provide a control system for sound reproducing apparatus the operation of which is started and stopped in the proper sequential manner by signal-initiated means under control of a selectively produced starting signal and a self-programmed stopping and reset signal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
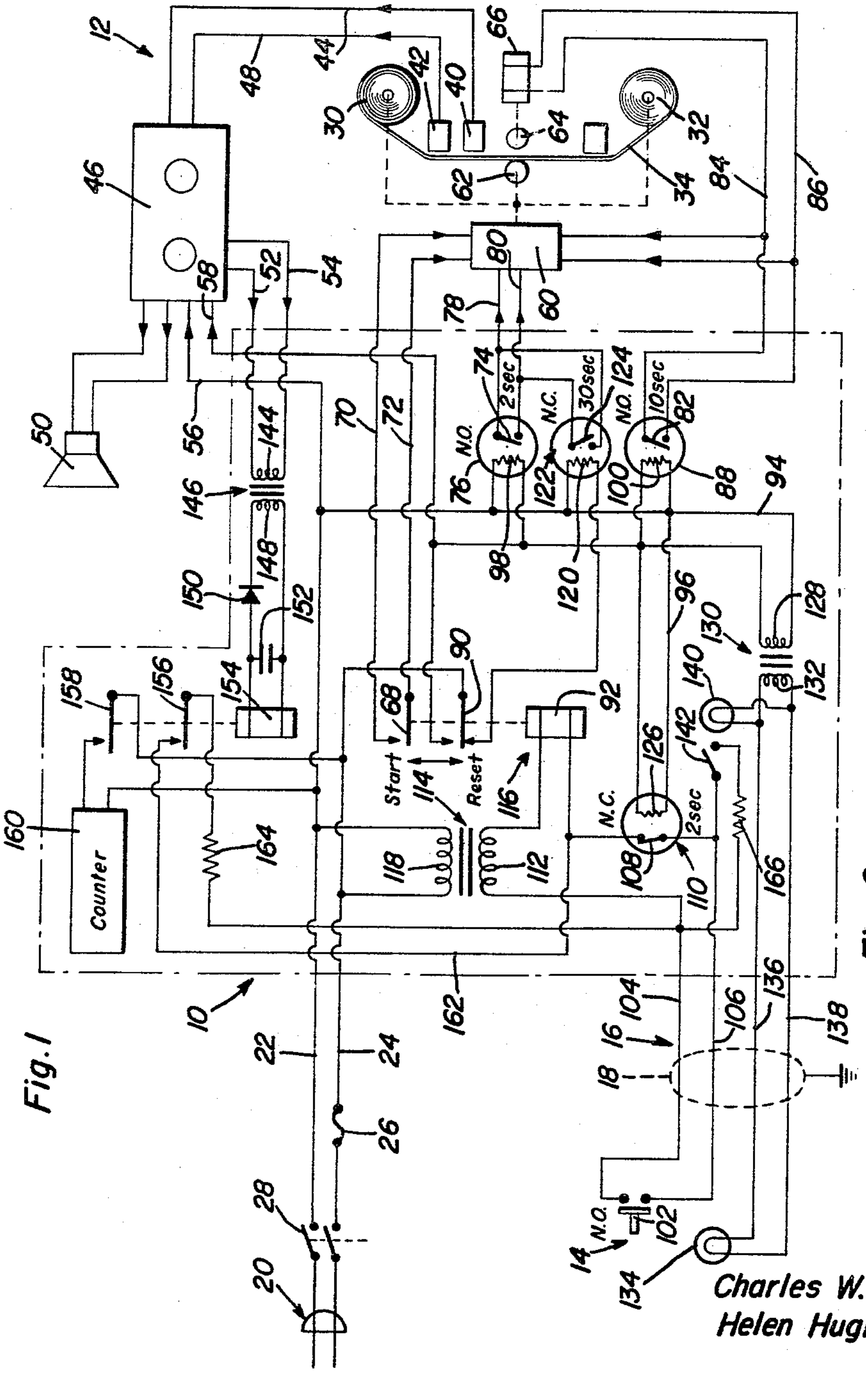
FIGURE 1 is an electrical circuit diagram illustrating the system of the present invention in association with diagrammatically illustrated components of a sound reproducing apparatus.

Referring now to the drawings in detail, it will be observed that most of the components forming the control system of the present invention may be housed within a control box enclosure generally referred to by reference numeral 10 electrically connected to sound reproducing apparatus generally referred to by reference numeral 12. The operator of the control system may be located remote from the control enclosure 10 at a control station 14 to which a four wire cable 16 extends from the control enclosure. The cable 16 is therefore provided with a grounded shield 18 while power for the system components is derived from any suitable source such as an available 110 volt A.C. source connected by the plug 20 to the powerlines 22 and 24. One of the powerlines may therefore be provided with a fuse 26 while an on-off switch 28 may be provided in order to disconnect the control system from the power supply when desired.

Figure 2:
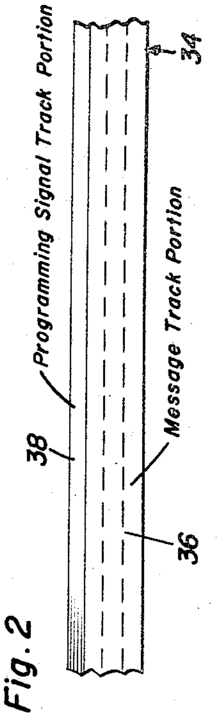
FIGURE 2 is an illustration of a portion of a multi-track recording tape that may be utilized in connection with the system of the present invention.

The sound reproducing apparatus 12 with which the control system of the present invention is particularly useful, is a commercially available multi-track tape recorder having playback and self-reversing facilities. The apparatus 12 as diagrammatically illustrated therefore includes a takeup reel 30 and a play-off reel 32 between which the record tape 34 is fed for playback purposes. The tape 34 as diagrammatically illustrated in FIGURE 2, may be of the magnetic type and provided with a message portion 36 and a programming signal portion 38 respectively cooperating with pickup heads 40 and 42. Accordingly, message signals will be conducted from the pickup head 40 through a line 44 for amplification through one channel of a two channel amplifier 46, program signals being conducted by a line 48 for amplification through the other channel of the amplifier. The message channel will therefore produce an audio output coupled to the speaker 50 whereby recorded messages are reproduced. Programming signals on the other hand, are fed by the other channel of the amplifier to the signal output lines 52 and 54 connected into the control system of the present invention. Power for rendering the amplifier 46 operative is supplied by means of the input lines 56 and 58. It will therefore be apparent, that when the tape 34 is fed from the play-off reel 32 to the takeup reel 30, recorded sound on the message track portion 36 will be reproduced in proper synchronization with any programming signal recorded on the programming signal portion 38 of the tape. The length of tape fed during one programmed cycle, will depend therefore on the signal picked up from the programming signal portion 38. The sound reproducing apparatus is therefore also provided with a drive and brake control circuit 60 through which drives for the reels 30 and 32 are energized as well as for supplying a D.C. braking current, the drive and brake control circuit 60 in itself forming no part of the present invention since it constitutes part of the commercially available tape recorder referred to. The tape transport mechanism of the tape recorder is therefore also provided with a capstan or tape drive motor 62 simultaneously energized with the drive for one or the other of the reels in the proper direction. Also, the drive-engaging pressure roller 64 is provided so that when the drive-engaging solenoid 66 is energized, the tape will be brought into driving engagement with the tape drive roller 62 for proper feeding thereof onto the takeup reel 30 for playback purposes. Accordingly, at this time, D.C. braking current would be established for the play-off reel drive in order to establish the proper tension for the tape 34. The drive and brake control circuit 60 is therefore rendered operative for playback control when a circuit therein is closed by the relay switch 68 in the control system, connected to the circuit 60 by the conductors 70 and 72. Operation of the drive and brake control circuit 60 for standby purposes on the other hand, is initiated upon closing of a normally open drive control switch 74 forming part of a thermal delay device 76 connected to the drive and brake control circuit 60 by means of the conductors 78 and 80. Energization of the drive-engaging solenoid 66 and reel drive, is effected by closing of the final operating switch 82 connected to the solenoid 66 by the conductors 84 and 86. The switch 82 forms part of a normally open thermal time delay device 88 operated in proper sequential relation to operation of the thermal time delay device 76 for both starting and stopping playback operation of the tape transport mechanism.

The thermal time delay devices 76 and 88 form part of a signal-initiated control circuit connected across the powerlines 22 and 24 when an initiating relay switch 90 is actuated to a start position by a signal responsive relay coil 92 which also closes the aforementioned relay switch 68 in order to condition the drive and brake control circuit 60 for playback operation. Actuation of the initiating switch 90 will therefore connect the conductors 94 and 96 across the powerlines 22 and 24 so as to establish energizing circuits for the heater filaments 98 and 100 of the thermal delay devices 76 and 88 respectively. Accordingly, after the elapse of two seconds following actuation of the initiating switch 90, the drive control switch 74 will be closed in order to start operation of the tape drive for playback purposes. After the elapse of ten seconds following actuation of the initiating switch 90, the final operating switch 82 will be closed so as to energize the drive-engaging solenoid 66. Playback operation will then begin without any necessity for sequential manual actuation of plural switches. Operation as aforementioned is instead initiated through the control system by the actuation of a single normally opened initiating switch 102 located at the remote control station 14.

The initiating switch 102 is connected by the conductors 104 and 106 in the four wire cable 16 to a start signal producing circuit including the relay coil 92 in series with the normally closed switch 108 of a start pulse disabling device 110 and the secondary winding 112 of a power transformer 114. The relay coil 92 forms part of an impulse relay device generally referred to by reference numeral 116 which includes the relay switch assembly consisting of the aforementioned relay switches 68 and 90.

The impulse relay in the initial reset position illustrated in FIGURE 1, is in a signal-receiving condition so that when the signal producing circuit is completed upon momentary closing of the initiating switch 102, the relay switch assembly will be displaced to the start position. Energizing current for the signal-producing circuit is derived from the primary winding 118 of the power relay 114 connected across the powerlines 22 and 24. It will therefore be apparent, that the primary of the transformer 114 is energized at all times. Also, when the impulse relay 116 is in its illustrated reset position, an energizing circuit will be established through the heater filament 120 of a thermal override delay device 122 so as to maintain the normally closed switch 124 thereof open, the switch 124 being connected across the lines 78 and 80 so as to override operation of the drive control switch 74 as will be hereafter explained.

When the initiating switch 102 is closed in order to displace the relay switch assembly of the impulse relay 116 to the start position, the initiating circuit completed by actuation of the relay switch 90 in addition to effecting delayed sequential closing of the drive control switch 74 and final operating switch 82, will also de-energize the heater 120 of the override device 122 so that the switch 124 thereof will open after elapse of thirty seconds. Also, after elapse of two seconds, or simultaneously with the closing of the drive control switch 74, the switch 108 of the signal disabling device 110 will open because of the energization of the heater element 126 upon closing of the initiating circuit by the initiating switch 90. Completion of the initiating circuit is also operative to energize the primary 128 of a pilot transformer 130 so that the secondary 132 thereof is energized in order to illuminate the pilot indicating lamp 134 at the remote control station 14 thereby providing an indicating signal for the operator that sequential operation has begun and that the impulse relay 116 is no longer in its signal-receiving condition. Subsequent actuation of the initiating switch 102 will then have no affect. The indicator lamp 134 is therefore connected to the pilot transformer secondary 132 by means of the conductors 136 or 138 within the four wire cable 16. A second indicator lamp 140 is also connected across the lines 136 and 138 at the control enclosure 10 adjacent to a test switch 142 through which an initiating signal may be alternatively established for the impulse relay 116 for test purposes as will hereafter be explained.

When the initiating switch 90 is actuated in order to complete the initiating circuit, the input lines 56 and 58 are also connected across the powerlines 22 and 24 so as to immediately supply energizing current to the amplifier 46. Thus, during the non-reproducing intervals, power to the amplifier is shutdown. Similarly, power supplied to the drive and brake control circuit 60 is disconnected when the sound reproducing apparatus has stopped. After the sound reproducing apparatus has been operating for a programmed period of time determined by the programming signals appearing on the track portion 38 of the tape, an output signal will be established in the primary 144 of the signal transformer 146 so as to produce an output signal in the secondary 148 rectified by a rectifying circuit including the selenium rectifier 150 and a loading capacitor 152 so as to establish a D.C. output signal on the sensitive signal-responsive relay coil 154. The output signal-responsive relay coil 154 will thereby be pulsed so as to close a reset relay switch 156 and a counting switch 158. Closing of the counting switch 158 will therefore connect an impulse counter 160 across the powerlines 22 and 24 so as to count each time the apparatus 12 is stopped. Closing of the reset switch 156 on the other hand, will dispatch a reset signal to the impulse relay 116 in order to restore the relay switch assembly thereof to the reset position. Accordingly, the reset switch 156 is connected by the conductor 162 to the relay coil 92 and by the voltage dropping resistor 164 to one side of the secondary winding 112 of the transformer 114 opposite the side to which the relay coil 92 is connected. An energizing pulse is thereby established for the relay coil 92 by-passing both the previously opened signal disabling switch 108 and initiating switch 102. The voltage dropping resistor 164 is provided for the purpose of preventing overload of the relay 92 by the reset signal established upon closing of the reset switch 156 when by-passing both the initiating switch 102 and the disabling switch 108. The test switch 142 is therefore arranged to by-pass only the initiating switch 102 so that it is connected between the disabling switch 108 and the secondary winding 112 of the transformer 114 in series with a voltage dropping resistor 166. It will be apparent therefore, that the reset signal will restore the relay switch assembly of the impulse relay to its reset position so as to sequentially open the thermal delay switches 74 and 82 in the same sequential order as described with respect to the starting of the sound reproducing apparatus. Although the override switch 124 will have been closed during operation of the sound reproducing apparatus because of de-energization of its heater filament 120, restoration of the relay switch assembly to the reset position will not be effective to promptly open the override switch 124 so that opening of the drive control switch 74 will not remove the D.C. braking current in the drive and brake control circuit 60. Complete stopping of the tape transport mechanism is thereby effected before the switch 82 opens to de-energize the drive-engaging solenoid 66.

Operation of the control system of the present invention may be summarized as follows: Upon closing of the initiating switch 102, an initiating signal is dispatched by completion of the secondary circuit for the transformer 114, the primary of which remains energized together with the filament 120 of the override delay device 122 so that its switch 124 is held open. The initiating signal therefore pulses the impulse relay 116 displacing its relay switch assembly from the reset position to the start position, the start signal pulse duration being limited by opening of the normally closed pulse disabling switch 108 after which a further start signal is not effective on the impulse relay. When the relay switch assembly of the impulse relay is moved to the start position, immediate energization of the amplifier is effected while closing of the energizing relay switch 68 immediately establishes braking current for override control to provide proper tape tension during subsequent feeding thereof. Actuation of the initiating relay switch 90 also immediately energizes the indicator 134 and the heater filaments of the time delay devices 76 and 88 for sequential operation of the tape transport mechanism. Also, the pulse disabling switch filament 126 is energized while the energizing circuit for the filament 120 of the override device 122 is opened. After elapse of two seconds following actuation of the initiating switch 90, the drive control switch 74 is closed for standby operation of the tape transport mechanism establishing energizing current for the tape drive motor 62 for forthcoming playback operation. At the same time, the pulse disabling switch 108 is opened to terminate the start signal. After elapse of ten seconds following intiation, the final operating switch 82 is closed to engage the tape pressure roll 64 and energize the reel drive in order to begin feeding of the tape.

When a message segment is completed, a signal output is picked up from the tape portion 38 by the programming pickup head 42 to transmit an output signal to the primary 144 of the signal transformer 146. The output signal from the transformer secondary is then rectified so as to provide a D.C. pulse for the signal-responsive relay coil 154 in order to close the relay reset switch 156 and the count switch 158. Closing of the reset switch dispatches a reset signal pulse to the impulse relay 116 through the voltage dropping resistor 164 by-passing both the initiating switch 102 and the pulse disabling switch 108 to reset the relay switch assembly. When reset, the amplifier and drive control circuit are immediately disabled so as to terminate the reset signal after which shutdown operation of the tape transport mechanism is begun while at the same time de-energizing the indicator 134 so as to indicate that a new cycle is ready. After elapse of two seconds during the stopping operation, the pulse disabling switch 108 is closed to condition the impulse relay 116 for reception of initiating signals while the drive control switch 74 opens but is not effective to remove the braking current from the reel drives since the override switch 124 remains closed thereby braking the drive to a complete stop before elapse of thirty seconds when the override switch is opened. Also prior to elapse of thirty seconds, the final operating switch 82 is opened after ten seconds, to withdraw the tape pressure roller and stop reels 30 and 32.

From the foregoing description, the construction, operation and utility of the control system of the present invention will be apparent. It will therefore be appreciated, that by virtue of the described arrangement, the reproducing fidelity or quality of the sound reproducing apparatus may be preserved and the objectives of the present invention achieved in a relatively efficient and simple manner without any unnecessary power drain. In this latter regard, only the main power transformer 114 continues to be activated. It will also be appreciated, that various modifications are contemplated in connection with the control system of the present invention including for example the connection of the override device 122 in parallel with the other thermal delay devices so as to increase the longevity of this device. This alternative arrangement, however, would be less accurate in connection with its override function. It is also contemplated, that programming signals from the tape may be utilized for other functions such as rewind control.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a multi-track record playing apparatus having a drive control circuit and a record feed control sequentially operated to start and stop simultaneous playback of message and programming signals through an amplifier, a control system associated with said record playing apparatus comprising; a single selectively actuated signal producing device, signal initiated means operatively connected to the drive control circuit and the feed control for sequential operation thereof, signal responsive means operatively connected to said signal producing device in a signal receiving condition for delayed operation of the signal initiated means by a start signal dispatched through the signal producing device, energizing means operatively connected to said signal responsive means for immediately energizing the drive control circuit and the amplifier in response to said start signal prior to beginning of said sequential operation of the signal initiated means, disabling means operatively connected to the signal responsive means for interrupting the signal receiving condition thereof to prevent receipt of any signal after sequential operation of the signal initiated means has begun, and reset means operatively connected to said amplifier and the signal responsive means for immediately disabling the amplifier and delayed restoration of the signal responsive means to said signal receiving condition in response to the programming signals, whereby operation of the signal initiated means is effected to stop playback of the record until the signal producing device is selectively actuated thereafter.

2. The combination of claim 1, including means operatively connected to said signal initiated means for indicating the signal receiving condition of the signal responsive means.

3. The combination of claim 2, including counting means operatively connected to the reset means for counting the number of times playback is stopped.

4. The combination of claim 3, including override control means operatively connected to the signal responsive means for changing sequential operation of the signal initiated means upon restoration of the signal responsive means to the signal receiving condition by the reset means to stop playback.

5. The combination of claim 1, including override control means operatively connected to the signal responsive means for changing sequential operation of the signal initiated means upon restoration of the signal responsive means to the signal receiving condition by the reset means to stop playback.

6. The combination of claim 5, including counting means operatively connected to the reset means for counting the number of times playback is stopped.

7. The combination of claim 1, wherein said signal initiated means includes normally open switch means, and time delay means operatively connected to the signal responsive means for sequential closing and opening of the switch means.

8. The combination of claim 7, including override control means operatively connected to the signal responsive means for changing sequential operation of the signal initiated means upon restoration of the signal responsive means to the signal receiving condition by the reset means to stop playback.

9. The combination of claim 8 wherein said override control means includes a switch device connected to the drive control circuit in parallel with said normally open switch means and having a longer delay period before opening and closing by the signal responsive means.

10. The combination of claim 1, wherein said disabling means comprises, signal duration switch means connected to the signal producing device and switch opening means operative to open said switch means in delayed response to receipt of a start signal by the signal responsive means.

11. The combination of claim 10, including override control means operatively connected to the signal responsive means for changing sequential operation of the signal initiated means upon restoration of the signal responsive means to the signal receiving condition by the reset means to stop playback.

References Cited

UNITED STATES PATENTS 2,787,669 4/1957 Flan et al. -------- 179—100.1

BERNARD KONICK, *Primary Examiner.*

L. G. KURLAND, *Assistant Examiner.*